US008657492B2

(12) United States Patent
Hasegawa et al.

(10) Patent No.: US 8,657,492 B2
(45) Date of Patent: Feb. 25, 2014

(54) ELECTRONIC THERMOMETER AND METHOD FOR MANUFACTURING THE SAME

(71) Applicant: Omron Healthcare Co., Ltd., Muko (JP)

(72) Inventors: Gaku Hasegawa, Kyoto (JP); Naoki Matsumoto, Kyoto (JP); Takanobu Yamauchi, Kyoto (JP); Atsushi Kawano, Takarazuka (JP); Yasuo Fujita, Nagaokakyo (JP)

(73) Assignee: Omron Healthcare Co., Ltd., Muko-Shi (JP)

( * ) Notice: Subject to any disclaimer, the term of this patent is extended or adjusted under 35 U.S.C. 154(b) by 0 days.

(21) Appl. No.: 13/749,353

(22) Filed: Jan. 24, 2013

(65) Prior Publication Data
US 2013/0148692 A1 Jun. 13, 2013

Related U.S. Application Data

(63) Continuation of application No. PCT/JP2011/065978, filed on Jul. 13, 2011.

(30) Foreign Application Priority Data

Sep. 17, 2010 (JP) .................................. 2010-209225

(51) Int. Cl.
*G01K 7/00* (2006.01)
*H01S 4/00* (2006.01)
(52) U.S. Cl.
USPC .......................................... 374/170; 29/592.1
(58) Field of Classification Search
USPC .......................................... 374/170; 29/592.1
See application file for complete search history.

(56) References Cited

U.S. PATENT DOCUMENTS

| 4,851,964 A | 7/1989 | Endo | |
|---|---|---|---|
| 2002/0101327 A1* | 8/2002 | Lavenuta | ..................... 338/22 R |
| 2013/0188666 A1* | 7/2013 | Hasegawa et al. | ............. 374/170 |

FOREIGN PATENT DOCUMENTS

| JP | 57019630 A | * | 2/1982 | ............... G01K 1/14 |
| JP | 61144522 A | * | 7/1986 | ............... G01K 7/00 |
| JP | Y2-2-28417 | | 7/1990 | |
| JP | A-2-210233 | | 8/1990 | |
| JP | Y2-6-25976 | | 7/1994 | |

(Continued)

OTHER PUBLICATIONS

Sep. 20, 2011 International Search Report issued in International Patent Application No. PCT/JP2011/065978.

*Primary Examiner* — Lisa Caputo
*Assistant Examiner* — Jamel Williams
(74) *Attorney, Agent, or Firm* — Oliff PLC

(57) ABSTRACT

An electronic thermometer that is inexpensive, has fast thermal response, and suppresses bending and directional misalignment of the lead of the temperature sensor during assembly. The electronic thermometer includes: a thermistor that includes a temperature sensing unit that measures the body temperature of a measurement subject and a lead having one end that is fixed to the temperature sensing unit; a hollow housing that houses the lead, and in which the temperature sensing unit is arranged on the tip side; a printed circuit board to which the other end of the lead is fixed; an assembly that includes the printed circuit board and is housed in the housing; and a plate-shaped member that is attached to the assembly and is arranged on the tip side of the housing relative to the assembly. The plate-shaped member has adhesive characteristics on a top face that opposes the lead.

6 Claims, 18 Drawing Sheets

(56) References Cited

FOREIGN PATENT DOCUMENTS

| JP | A-9-89680 | 4/1997 |
| JP | U-3067903 | 4/2000 |
| JP | A-2010-32324 | 2/2010 |
| WO | WO 2010/013634 A1 | 2/2010 |

* cited by examiner

US 8,657,492 B2

ELECTRONIC THERMOMETER AND METHOD FOR MANUFACTURING THE SAME

This is a Continuation of International Patent Application No. PCT/W2011/065978 filed Jul. 13, 2011, which claims priority to JP-2010-209225, filed Sep. 17, 2010. The disclosure of the prior application is hereby incorporated by reference herein in its entirety.

TECHNICAL FIELD

The present invention relates to an electronic thermometer and a method for manufacturing the same, and in particular relates to an electronic thermometer that includes a radial lead temperature sensor and a method for manufacturing such an electronic thermometer.

BACKGROUND ART

In general, with an electronic thermometer for performing body temperature measurement when placed at a measurement site such as the armpit or under the tongue, a liquid crystal display, a printed circuit board, and the like are fixed in a sub-case, the sub-case is arranged inside a main housing, a temperature sensor is housed in a temperature measuring unit, and the temperature measuring unit is provided in the front end portion of the main housing. A temperature sensing unit that senses the temperature at the measurement site and a processing circuit formed by mounting various types of electrical parts on the printed circuit board are connected by a small, relatively rigid lead. The lead that electrically connects the temperature sensing unit to the processing circuit has a terminal portion that is fixed to the printed circuit board and a long portion that extends out from the printed circuit board.

Conventional common "pencil-type" electronic thermometers employ a structure in which the electronic thermometer is completed by inserting the sub-case into a cylindrical main housing through its rear end portion. In this case, if the temperature sensor lead that extends out from the sub-case becomes bent or directionally misaligned, faults occur in which the insertion of the temperature sensor into the main housing does not go well, measurement precision decreases due to positional misalignment of the temperature sensing unit at the tip of the temperature sensor, and product variations (instrumental error) arise between individual electronic thermometers. Aiming for the realization of automation in electronic thermometer assembly therefore requires an improvement in the step in which the temperature sensor that extends out from the sub-case is inserted into the main housing.

For example, JP H9-89680A (Patent Literature 1) discloses an electronic thermometer in which the above-described printed circuit board is extended to the temperature measuring unit, a conductive line is formed in the extension portion of the printed circuit board, and the temperature sensing unit is mounted at the tip of the extension portion, thus ensuring electrical connection between the temperature sensor and the processing circuit via the conductive line.

CITATION LIST

Patent Literature

Patent Literature 1: JP H9-89680A

SUMMARY OF INVENTION

Technical Problem

The technology described in this literature requires the printed circuit board to be extended to the temperature measuring unit, and thus has the problem of an increase in material cost. Also, since the printed circuit board is not rectangular in shape, there are portions that are discarded when the printed circuit board is manufactured, and there is an increase in wastefulness, thus leading to a further increase in material cost. Furthermore, the temperature sensor mounted at the tip of the printed circuit board cannot be a common radial lead thermistor, but rather needs to be a specially-shaped temperature sensor as shown in FIGS. 7 and 8 of the above-described literature, thus leading to a further increase in cost.

In addition, the lead is configured by a pattern formed on the printed circuit board, and the lead portion is integrated with the printed circuit board and the temperature sensing unit, and therefore in the case where the electronic thermometer is stored in a low-temperature environment, a longer time is required for measurement due to the influence of a large difference between the body temperature at the measurement site and the low temperature of the lead portion, the printed circuit board, and the temperature sensing unit. Moreover, the heat applied to the temperature sensor during measurement escapes via the printed circuit board, thus leading to the problems that the thermal response of the electronic thermometer slows down, and it becomes difficult to make a precise measurement in a short time, which is disadvantageous to fast measurement.

The present invention was achieved in light of the above-described problems, and a main object thereof is to provide an electronic thermometer that is inexpensive, has fast thermal response, and suppresses bending and directional misalignment of the lead of the temperature sensor during assembly.

Solution to Problem

An electronic thermometer according to the present invention includes a temperature sensor. The temperature sensor includes a temperature sensing unit that measures the body temperature of a measurement subject, and a lead having one end that is fixed to the temperature sensing unit. The electronic thermometer also includes a hollow housing that houses the lead, and in which the temperature sensing unit is arranged on a tip side. The electronic thermometer also includes a board to which another end of the lead is fixed, an assembly that includes the board and is housed in the housing, and a plate-shaped member that is attached to the assembly and is arranged on the tip side of the housing relative to the assembly. The plate-shaped member has an adhesion portion that has adhesive characteristics on a top face that opposes the lead.

In the above-described electronic thermometer, a contact reduction portion that reduces contact between the lead and the top face may be formed in the plate-shaped member.

In the above-described electronic thermometer, the adhesion portion may position the lead relative to the plate-shaped member when the lead is affixed to the adhesion portion.

In the above-described electronic thermometer, the adhesion portion may have a property that the adhesive characteristics decrease when heat is applied.

In the above-described electronic thermometer, the lead may be arranged in a contactless state with respect to the plate-shaped member.

A method for manufacturing an electronic thermometer according to the present invention is a method for manufacturing an electronic thermometer that includes: a temperature sensor that includes a temperature sensing unit that measures the body temperature of a measurement subject and a lead having one end that is fixed to the temperature sensing unit; and a hollow housing that houses the lead, and in which the temperature sensing unit is arranged on a tip side. The manufacturing method includes: a step of preparing an assembly that includes a board; a step of preparing a plate-shaped member that has an adhesion portion with adhesive characteristics on a top face; a step of fixing another end of the lead to the board; a step of reducing curvature of the lead; a step of, in a state in which curvature of the lead is reduced, attaching the plate-shaped member to an end portion of the assembly such that the adhesion portion opposes the lead, and adhering the lead to the adhesion portion; and a step of, in a state in which the lead is adhered to the adhesion portion, inserting the assembly into the housing, the end portion side to which the plate-shaped member is attached being inserted first.

Advantageous Effects of Invention

According to the present invention, it is possible to provide an electronic thermometer that is inexpensive, has fast thermal response, and suppresses bending and directional misalignment of the lead of the temperature sensor during assembly of the electronic thermometer.

DESCRIPTION OF EMBODIMENTS

Figure 1:
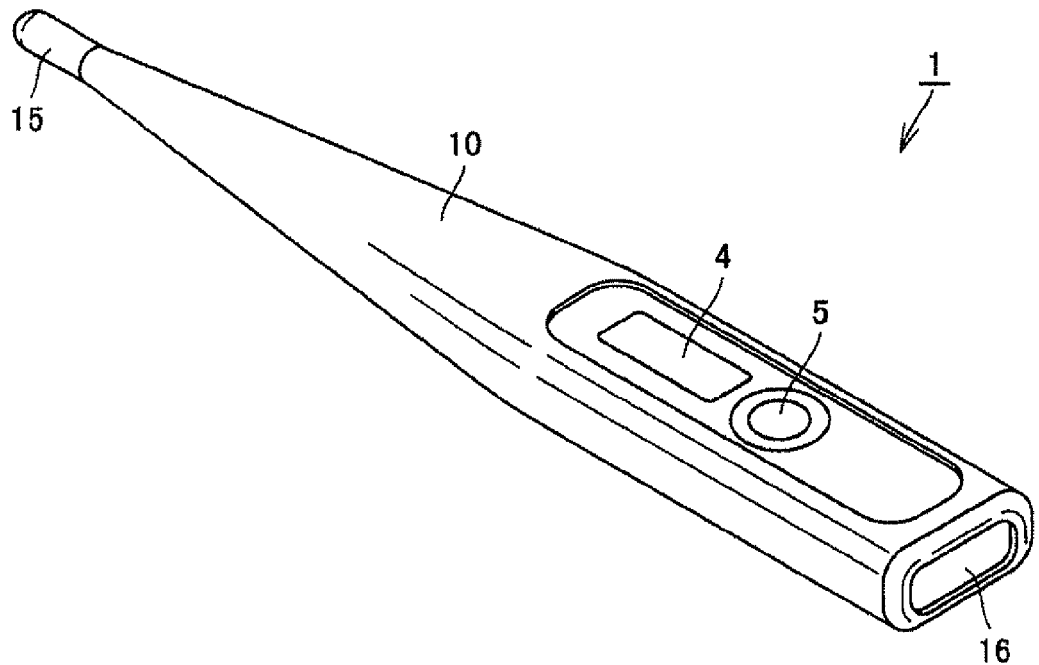
FIG. 1 is a perspective view of an external structure of an electronic thermometer according to a first embodiment of the present invention.

Hereinafter, embodiments of the present invention will be described in detail with reference to the drawings. Note that identical or corresponding elements are given the same reference numerals in the drawings, and individual descriptions thereof will not be repeated.

First Embodiment

Figure 2:
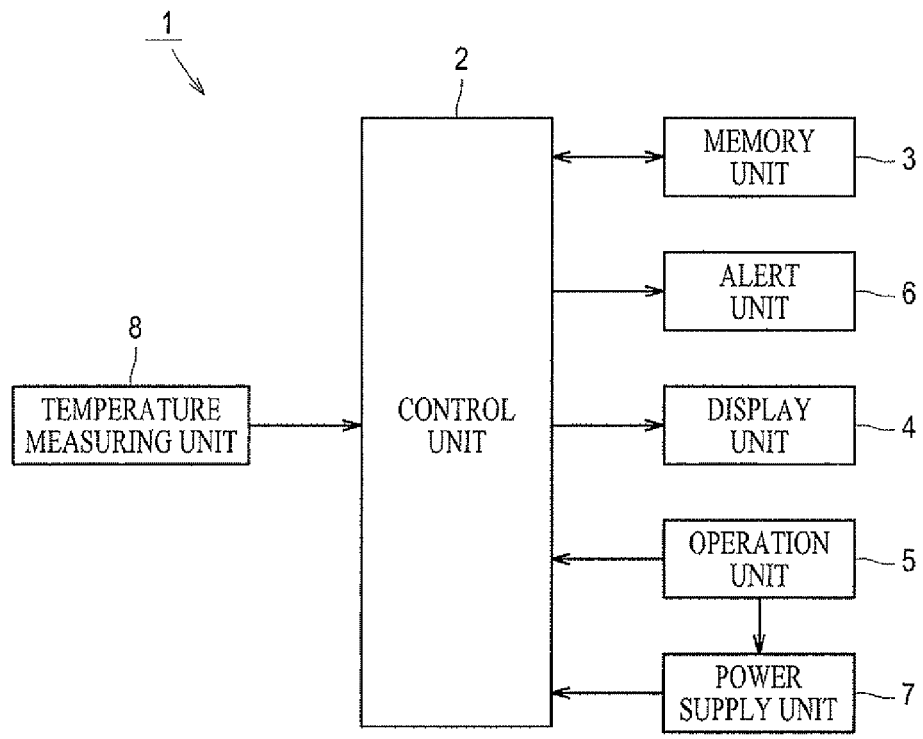
FIG. 2 is a diagram showing a configuration of functional blocks of the electronic thermometer.

FIG. 1 is a perspective view of an external structure of an electronic thermometer 1 according to a first embodiment of the present invention, and FIG. 2 is a diagram showing a configuration of functional blocks of the electronic thermometer 1 shown in FIG. 1. First, the overall configuration of the electronic thermometer 1 of the present embodiment will be described with reference to FIGS. 1 and 2.

As shown in FIG. 1, the electronic thermometer 1 of the present embodiment includes a main housing 10, a cap 15 that forms a temperature measuring unit, and an obstructing member 16. The main housing 10 is a tubular hollow member made of a resin material such as ABS (acrylonitrile butadiene styrene) resin. The main housing 10 has a faceplate affixed at a predetermined position on its top face, and also has a display unit 4 and an operation unit 5 at predetermined positions on its top face. The cap 15 is a bottomed tube-shaped member, one end of which is obstructed. The cap 15 is formed from any material, examples of which include a resin material and a metal material such as a stainless alloy. The obstructing member 16 is a block-shaped member made of a resin material such as ABS resin.

The cap 15 is attached to a tip portion 11 (see FIG. 3), which is one end portion of the main housing 10 in the axial direction (lengthwise direction). The obstructing member 16 is attached to a rear end portion 12 (see FIG. 3), which is the other end portion of the main housing 10 in the axial direction (lengthwise direction). The casing of the electronic thermometer 1 of the present embodiment includes the main housing 10, the cap 15 arranged at the tip of the main housing 10, and the obstructing member 16 arranged at the rear end of the main housing 10.

As shown in FIG. 2, the electronic thermometer 1 of the present embodiment includes a control unit 2, a memory unit 3, an alert unit 6, a power supply unit 7, and a temperature measuring unit 8 in addition to the above-described display unit 4 and operation unit 5. The control unit 2 is a means for performing overall control of the electronic thermometer 1, and is configured by a CPU (central processing unit), for example. The memory unit 3 is a means for storing a program for causing the control unit 2 or the like to execute a processing procedure for body temperature measurement, and for storing measurement results and the like, and is configured by a ROM (read-only memory), a RAM (random-access memory), or the like.

The display unit 4 is a means for displaying measurement results and the like, and is configured by a display panel such as an LCD (liquid crystal display). The operation unit 5 is a means for accepting user operations and inputting such commands from the outside to the control unit 2 and the power supply unit 7, and is configured by a push button, for example. The alert unit 6 is a means for informing a user that measurement has ended, that a user operation was accepted, and the like, and is configured by a buzzer, for example.

The power supply unit 7 is a means for supplying the control unit 2 with power as a power source, and is configured by a button cell, for example. The temperature measuring unit 8 includes the above-described cap 15 and a temperature sensing unit 73 (see FIG. 3 etc.) that is housed inside the cap 15, and is the site for detecting the body temperature when placed at a measurement site such as the armpit or under the tongue.

The control unit 2 includes a processing circuit for executing body temperature measurement, and measures the body temperature based on a program that was read out from the memory unit 3. In temperature measurement, the control unit 2 calculates a body temperature as the measurement result by processing temperature data that was input from the temperature measuring unit 8. The control unit 2 furthermore controls the electronic thermometer 1 so as to display the calculated body temperature on the display unit 4, store the calculated body temperature in the memory unit 3, and inform the user that measurement ended using the alert unit 6.

Figure 3:
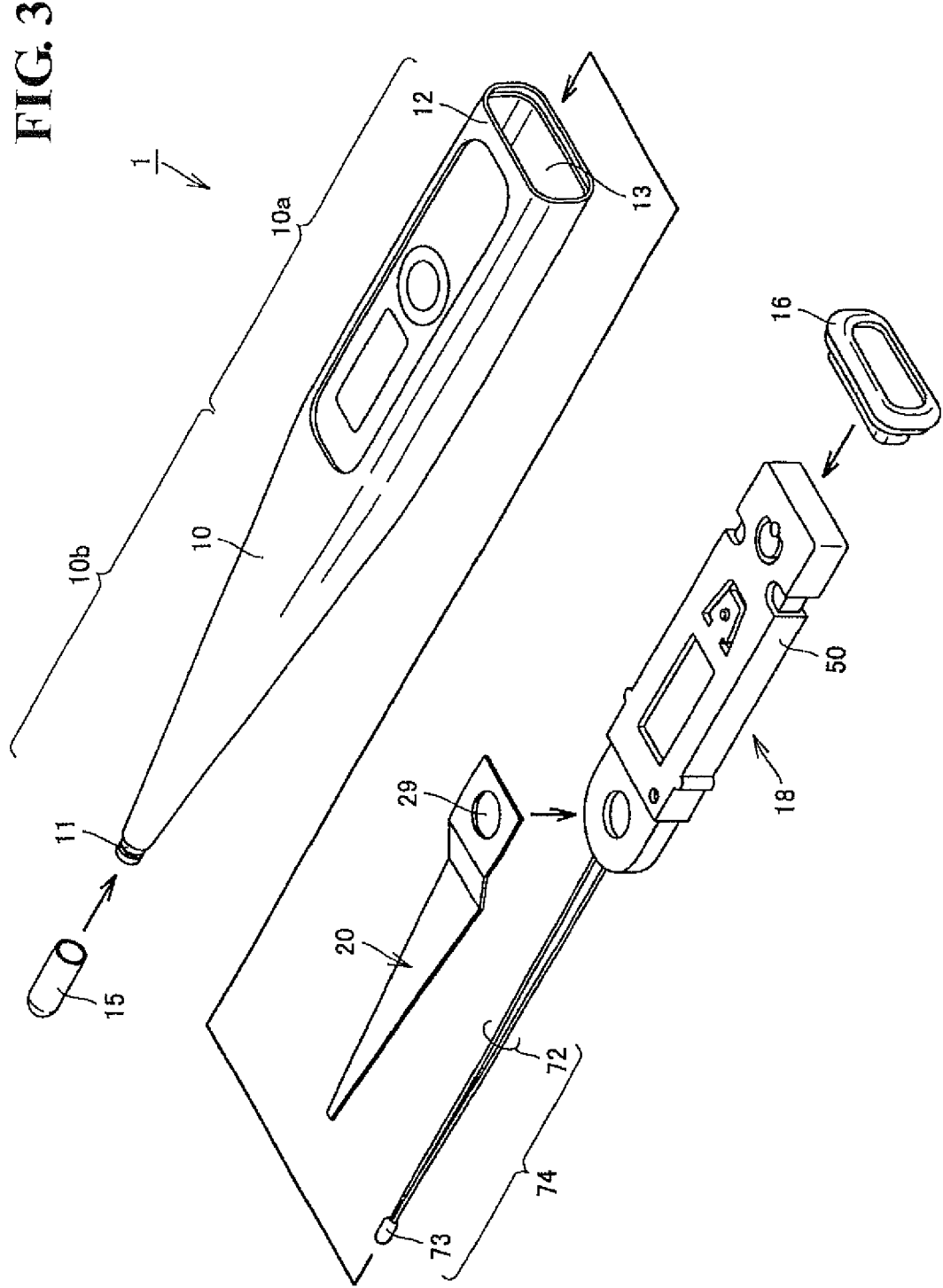
FIG. 3 is an exploded perspective view of an assembled structure of the electronic thermometer.

Next, an assembled structure of the electronic thermometer 1 of the present embodiment will be described. FIG. 3 is an exploded perspective view of the assembled structure of the electronic thermometer 1 shown in FIG. 1.

As shown in FIG. 3, the electronic thermometer 1 of the present embodiment includes the main housing 10, the cap 15, and the obstructing member 16 that serve as the above-described casing, and an assembly 18 serving as a sub-assembly formed by assembling various types of internal constituent parts. The main housing 10 includes a hollow main portion 10a that houses the assembly 18, and a hollow probe portion 10b that is arranged between the main portion 10a and the cap 15 that forms the temperature measuring unit.

The cap 15 is fixed by adhesion or the like to the tip portion 11 that forms the front end of the main housing 10. The assembly 18 is housed in a hollow portion 13 inside the main housing 10 due to being inserted into the main housing 10 through an opening located at the rear end portion 12. The obstructing member 16 is fixed to the main housing 10 by adhesion, ultrasonic welding, or the like so as to obstruct the above-described opening located at the rear end portion 12 of the main housing 10. Here, if ultrasonic welding is employed to fix the obstructing member 16 to the main housing 10, processing can be performed in a shorter time than if adhesion is employed.

Note that the cap 15 is not limited to the example where it is formed as a separate member from the main housing 10 as shown in FIG. 3. For example, a configuration is possible in which the cap 15 is made of a resin material, and the main housing 10 and the cap 15 are formed into an integrated structure as one resin molded part.

The electronic thermometer 1 further includes a plate-shaped member 20. The plate-shaped member 20 may be a plate member that has a thickness of approximately 0.2 mm to 0.5 mm and is made of a resin material, representative examples of which include PET (polyethylene terephthalate) and PC (polycarbonate). Also, the plate-shaped member 20 may be a plate member that has a thickness of approximately 1 mm and is made of paper.

The plate-shaped member 20 is attached to a sub-case 50 of the assembly 18, and is inserted into the main housing 10 along with the assembly 18 in the state of being a structure integrated with the sub-case 50. Inside the main housing 10, the plate-shaped member 20 is arranged on the tip portion 11 side of the main housing 10 relative to the assembly 18. A through-hole 29 that pierces the plate-shaped member 20 in the thickness direction is formed in the plate-shaped member 20 at a position that corresponds to a later-described buzzer housing portion 53.

Figure 4:
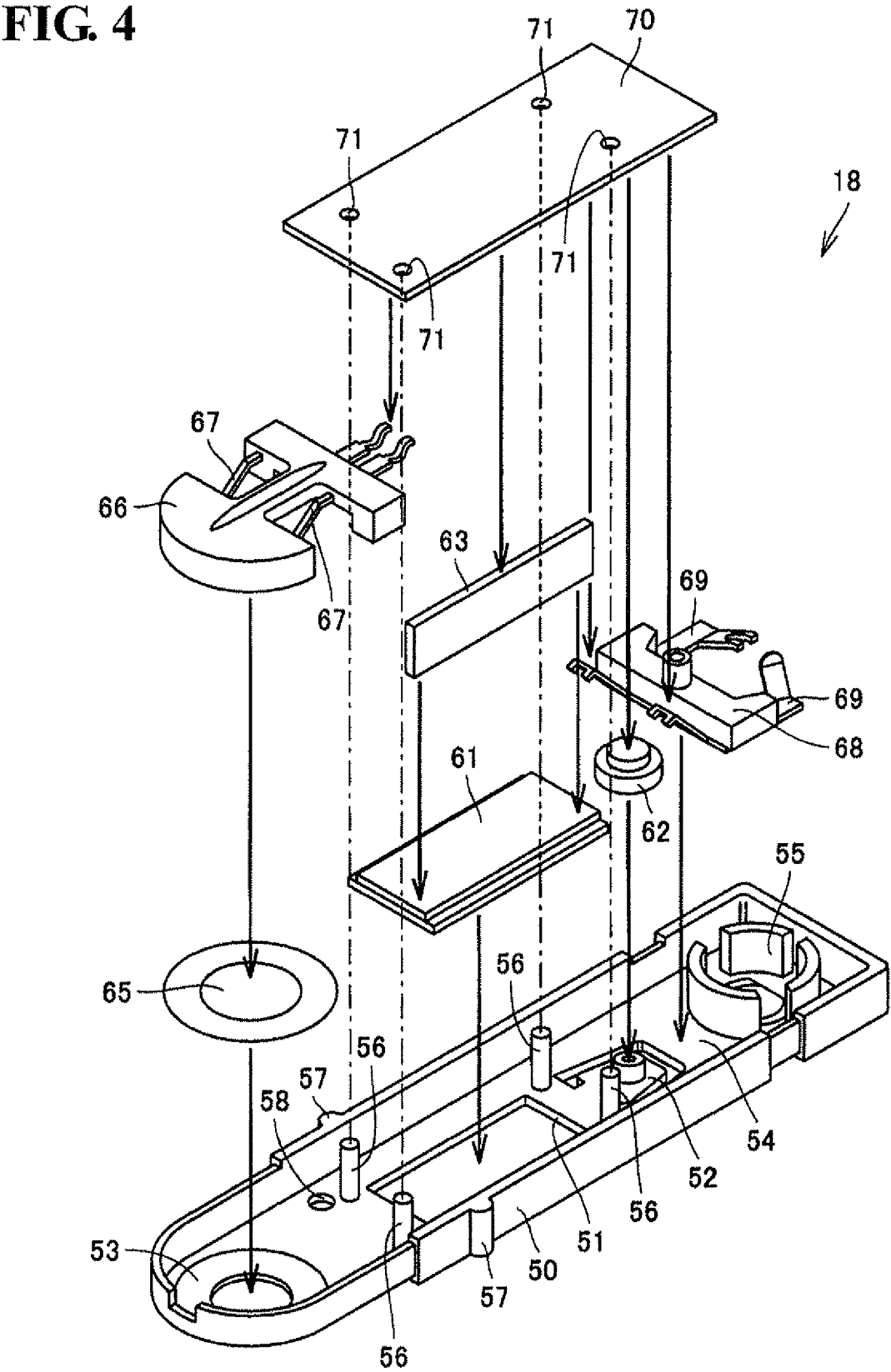
FIG. 4 is an exploded perspective view of an assembled structure of an assembly of the electronic thermometer.

FIG. 4 is an exploded perspective view of the assembled structure of the assembly 18 shown in FIG. 3. Note that the exploded perspective view of FIG. 4 shows the vertically inverted exploded state of the assembly 18 shown in FIG. 3.

As shown in FIG. 4, the assembly 18 mainly includes the sub-case 50 serving as a holding member, a printed circuit board 70 to which a lead 72 is attached, a display unit assembly 61 that configures the display unit 4, an operation unit assembly 62 that configures the operation unit 5, an elastic connector 63, a buzzer 65 serving as the alert unit 6, a buzzer cover 66 to which terminals 67 are attached, and a fixing member 68 to which terminals 69 are attached.

The sub-case 50 serves as the base to which the above-described various types of internal constituent parts are attached, and is a flattened substantially cuboid member that has an open lower end and is formed from a resin material such as ABS resin. A display window portion 51 is formed by providing an opening at a predetermined position in the upper end face of the sub-case 50, and an operation tongue portion 52 is formed at a predetermined position in the upper end face of the sub-case 50 by cutting out a portion of the upper end face. Here, a projection portion for positioning and fixing the operation unit assembly 62 is formed at a predetermined position on the operation tongue portion 52.

Also, the buzzer housing portion 53 that houses the buzzer 65 is provided at a position toward the front end of the sub-case 50, and a fixing member housing portion 54 that houses the fixing member 68 and a cell housing portion 55 that houses a button cell are provided at positions toward the rear end of the sub-case 50. Furthermore, multiple support pins 56 for supporting the printed circuit board 70 are provided at predetermined positions on the upper end face of the sub-case 50.

The display unit assembly 61 is configured by a substantially plate-shaped assembly that includes the above-described display panel, and is attached to the sub-case 50 by being placed at the position at which the display window portion 51 of the sub-case 50 is formed, such that the display panel faces the display window portion 51. The operation unit assembly 62 is configured by a substantially columnar assembly, and is attached by being placed at the position at which the operation tongue portion 52 of the sub-case 50 is formed.

Here, a recessed portion is formed in the main face of the operation unit assembly 62 on the sub-case 50 side, and the operation unit assembly 62 is positioned and fixed to the operation tongue portion 52 due to the recessed portion being fitted with the above-described projection portion provided on the operation tongue portion 52. A rubber sheet that has elasticity is affixed to the bottom face of the operation unit assembly 62, which is on the opposite side of the main face side on which the recessed portion is formed. This rubber sheet is arranged so as to face the printed circuit board 70 across a predetermined gap after assembly, and comes into contact with the printed circuit board 70 if the user presses the operation unit 5. The rubber sheet has electrical conductivity due to being formed from electrically conductive rubber or having its surfaces subjected to carbon printing, and therefore switches the conductive/non-conductive state of a connection point provided on the printed circuit board 70 in accordance with the user operation.

Also, the elastic connector 63 is provided at a predetermined position on the display unit assembly 61 when it is attached to the sub-case 50. The elastic connector 63 is an insulation displacement connector part that includes a cushioning material that has elasticity, and is fixed so as to be sandwiched between the above-described display unit assembly 61 and the later-described printed circuit board 70, thus electrically connecting the display panel included in the display unit assembly 61 and the printed circuit board 70.

The buzzer 65, which serves as a sounding body for emitting a sound such as a signal sound, is a thin disc-shaped electrical part in which a diaphragm and a piezoelectric plate are integrated. The buzzer 65 is placed on and attached to the sub-case 50 by being housed in the buzzer housing portion 53 provided in the sub-case 50. Also, in addition to the above-described buzzer 65, the buzzer cover 66 that serves as a sounding body fixing portion for fixing the buzzer 65 is attached to the buzzer housing portion 53 of the sub-case 50.

The buzzer cover 66 is a member made of resin, and is formed such that the terminals 67 are integrated with it. The buzzer cover 66 is attached to the sub-case 50 by being placed on the buzzer housing portion 53 so as to cover the buzzer 65 when it is placed on the sub-case 50. The terminals 67 are electrically conductive members that have a flat spring structure, and are for electrically connecting the buzzer 65 and the printed circuit board 70. Note that a method such as insert molding, adhesion, or fitting can be employed to integrate the buzzer cover 66 and the terminals 67.

The fixing member 68 is configured by a member that is made of resin and has terminals 69 integrated with it, and is placed on and attached to the sub-case 50 by being housed in the fixing member housing portion 54 of the sub-case 50. Portions of the terminals 69 that are integrated with the fixing member 68 reach the cell housing portion 55 due to the fixing member 68 being housed in the fixing member housing portion 54. Also, a button cell (not shown) is housed in the cell housing portion 55 of the sub-case 50 as described above. The terminals 69 are electrically conductive members that have a flat spring structure, and are for electrically connecting the button cell housed in the cell housing portion 55 and the later-described printed circuit board 70. Note that a method such as insert molding, adhesion, or fitting can be employed to integrate the fixing member 68 and the terminals 69.

The printed circuit board 70 is configured by a plate-shaped rigid wiring substrate that is substantially rectangular in a plan view, and has predetermined pattern of conductive lines formed on its top face. Various types of electrical parts are mounted on the top face of the printed circuit board 70, and thus various types of circuits such as the above-described processing circuit for executing body temperature measurement are formed on the printed circuit board 70. The processing circuit provided on the printed circuit board 70 is electrically connected to the temperature sensing unit 73, which is a small temperature sensing element, via the above-described lead 72, and is also physically fixed to the printed circuit board 70 via the lead 72. The temperature sensing unit 73 and the lead 72 form a radial lead thermistor 74 that extends in the same direction as and parallel with the lead 72, and serves as the temperature sensor of the present embodiment (see FIG. 3).

The above-described display unit assembly 61, operation unit assembly 62, elastic connector 63, buzzer 65, buzzer cover 66 with terminals 67, and fixing member 68 with terminals 69 are attached to the sub-case 50, and the printed circuit board 70 is attached to and housed in the sub-case 50. At this time, the printed circuit board 70 is placed on the sub-case 50 such that the support pins 56 provided on the sub-case 50 are inserted into through-holes 71 that are provided at predetermined positions in the printed circuit board 70, and portions of the support pins 56 that project out from the through-holes 71 are subjected to thermal caulking. Accordingly, the printed circuit board 70 is attached in a state of being pressed toward the sub-case 50. In this state, the above-described various types of parts such as the display unit assembly 61 are fixed due to being sandwiched between the sub-case 50 and the printed circuit board 70.

Note that a reference hole 58 used for positioning when placing the sub-case 50 on an apparatus for assembling the electronic thermometer 1 is provided at a predetermined position in the upper end face of the sub-case 50 of the electronic thermometer 1 of the present embodiment. Also, bulging portions 57 for fixing the assembly 18, which includes the sub-case 50, when it is inserted into the hollow portion 13 of the main housing 10 are provided at predetermined positions on side faces of the sub-case 50 of the electronic thermometer 1 of the present embodiment.

Figure 5:
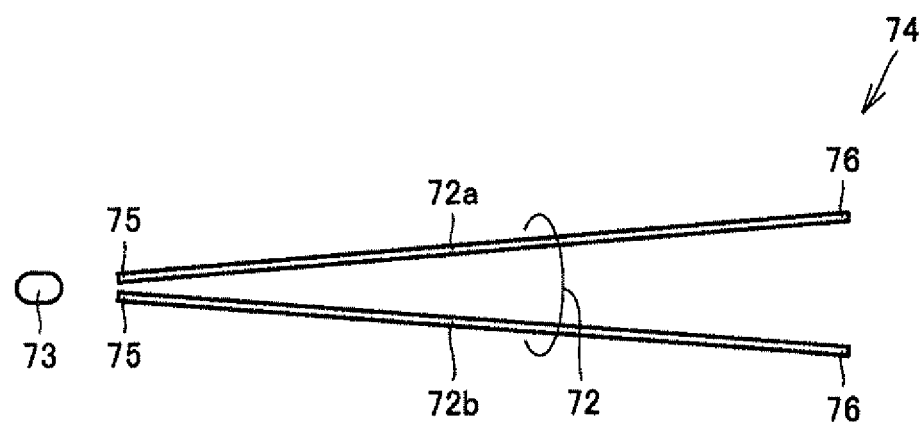
FIG. 5 is an exploded perspective view of a thermistor.

FIG. 5 is an exploded perspective view of the thermistor 74. As shown in FIG. 5, the thermistor 74 serving as the temperature sensor of the present embodiment includes the lead 72 and the temperature sensing unit 73 for measuring the body temperature of a measurement subject. The lead 72 has a pair of conductive wires 72a and 72b. The thermistor 74 is a radial lead thermistor in which the pair of conductive wires 72a and 72b extend in the same direction and parallel with each other. One end 75 of the lead 72 (conductive wires 72a and 72b) is fixed to the temperature sensing unit 73. The other end 76 of the lead 72 (conductive wires 72a and 72b) is fixed to the printed circuit board 70 shown in FIG. 4.

Figure 6:
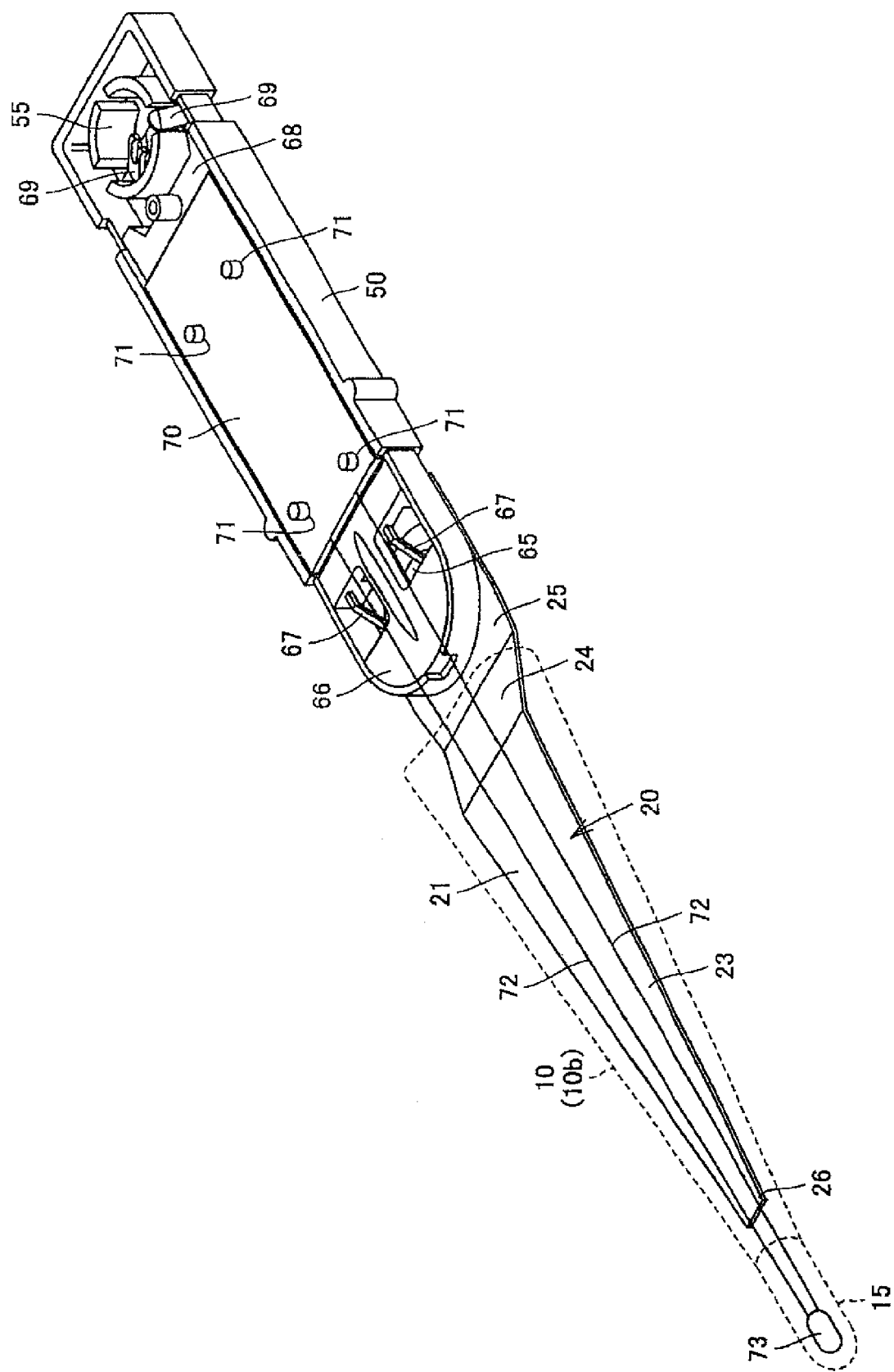
FIG. 6 is a perspective view of an internal structure of the electronic thermometer.
Figure 7:
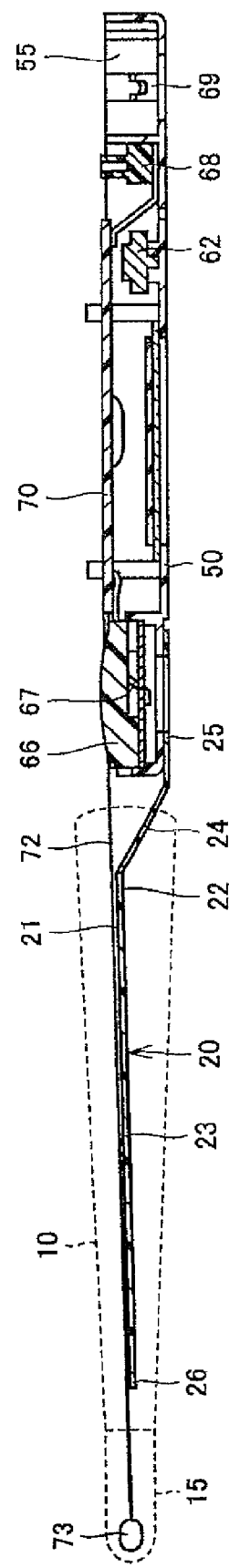
FIG. 7 is a cross-sectional view of the internal structure of the electronic thermometer.

FIG. 6 is a perspective view of the internal structure of the electronic thermometer 1. FIG. 7 is a cross-sectional view of the internal structure of the electronic thermometer 1. FIGS. 6 and 7 show the constituent parts arranged inside the casing of the electronic thermometer 1, and only the outer shapes of the cap 15 and the probe portion 10b of the main housing 10 of the easing of the electronic thermometer 1 are shown by dashed lines.

As shown in FIGS. 6 and 7, the temperature sensing unit 73 of the thermistor 74 is housed inside the cap 15 arranged on the tip portion 11 side of the main housing 10, and is fixed inside the cap 15. The lead 72 of the thermistor 74 is housed inside the probe portion 10b of the main housing 10. The lead 72 is arranged so as to project from the printed circuit board 70 toward the temperature sensing unit 73, extending beyond the buzzer cover 66 and the plate-shaped member 20, and extending substantially linearly.

The plate-shaped member 20 includes an extending portion 23 that extends in the axial direction (lengthwise direction) of the electronic thermometer 1 inside the hollow portion in the probe portion 10b, a base portion 25 that is fixed to the sub-case 50 of the assembly 18, and a connecting portion 24 that connects the extending portion 23 and the base portion 25. The base portion 25 is in planar contact with the sub-case 50 on the side of the assembly 18 that is opposite to the side on which the printed circuit board 70 is arranged, and is fixed to the sub-case 50. The extending portion 23 extends inside the probe portion 10b toward the tip portion 11, and a projecting end 26 of the extending portion 23 is arranged in the vicinity of the tip portion 11 (see FIG. 3) in the probe portion 10b. The projecting end 26 forms an end portion of the plate-shaped member 20 on the side that is away from the base portion 25 that is fixed to the assembly 18.

As is particularly clearly shown in FIG. 7, the plate-shaped member 20 is bent at the boundary between the base portion 25 and the connecting portion 24, and extends from the above-described opposite side of the assembly 18, on which the base portion 25 is fixed to the sub-case 50, toward the side of the assembly 18 on which the printed circuit board 70 is arranged. The plate-shaped member 20 is also bent at the boundary between the connecting portion 24 and the extending portion 23, and consequently the extending portion 23 extends substantially parallel to the base portion 25. The extending portion 23 extends inside the probe portion 10b substantially parallel to the lead 72 that extends from the printed circuit board 70 toward the temperature sensing unit 73. The plate-shaped member 20 having this shape may be formed by, for example, subjecting a flat plate-shaped material (a flat plate made of a resin material such as PET or PC, or heavy paper) to bending processing in advance.

The plate-shaped member 20 is fixed to the assembly 18 due to the base portion 25 being affixed to the surface of the end portion of the assembly 18 in the direction in which it extends. The structure for fixing the plate-shaped member 20 to the assembly 18 is not limited to this, and a configuration is possible in which, for example, the plate-shaped member 20 is formed so as to extend such that it covers the display window portion 51 and the operation tongue portion 52 shown in FIG. 4 and reaches the cell housing portion 55, and thus covers the entirety of the sub-case 50.

Figure 8:
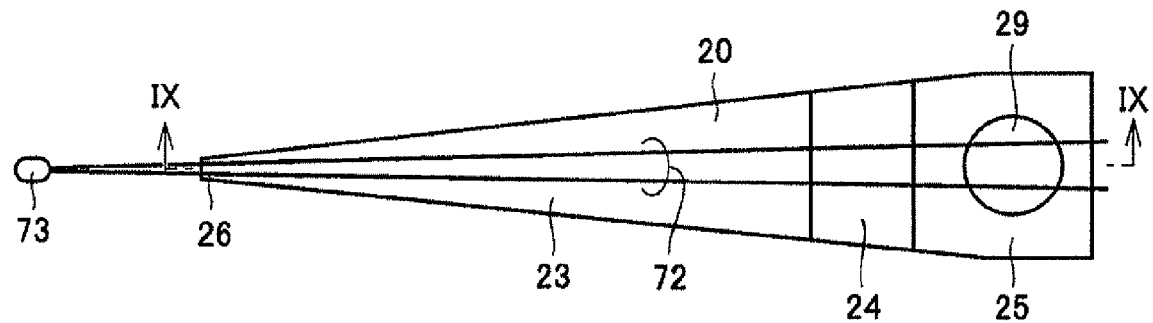
FIG. 8 is a plan view of an arrangement of a plate-shaped member and a lead.
Figure 9:
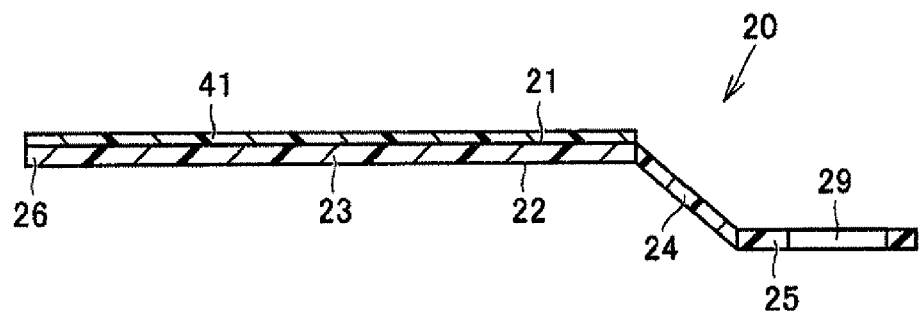
FIG. 9 is a cross-sectional view of the plate-shaped member taken along line IX-IX shown in FIG. 8.

FIG. 8 is a plan view of the arrangement of the plate-shaped member 20 and the lead 72. FIG. 9 is a cross-sectional view of the plate-shaped member 20 taken along line IX-IX shown in FIG. 8. As shown in FIG. 9, the plate-shaped member 20 has a top face 21 that opposes the lead 72 and a bottom face 22 on the opposite side of the top face 21. The plate-shaped member 20 has an adhesion portion 41 that has adhesive characteristics on the top face 21. The adhesion portion 41 may be formed by applying (printing) an adhesive onto the top face 21 of the plate-shaped member 20, or may be formed by affixing double-faced tape to the top face 21.

The adhesion portion 41 is provided on at least a portion of the top face 21 of the extending portion 23 that opposes the lead 72 in the state in which the extending portion 23 of the plate-shaped member 20 is arranged inside the probe portion 10b as shown in FIG. 6. Affixing the lead 72 to the adhesion portion 41 prevents bending and directional misalignment of the lead 72. Holding the lead 72 with the adhesion portion 41 realizes a configuration in which the lead 72 is fixed to the plate-shaped member 20, and there is no relative positional misalignment of the lead 72 with respect to the plate-shaped member 20. The adhesion portion 41 positions the lead 72, which is adhered to the adhesion portion 41, with respect to the plate-shaped member 20. In order to maintain the shape of the plate-shaped member 20 itself so as to prevent bending of the lead 72, the plate-shaped member 20 is formed from a material whose rigidity is high to a certain extent so as to not tend to warp or bend in a cantilever state.

Figure 10:
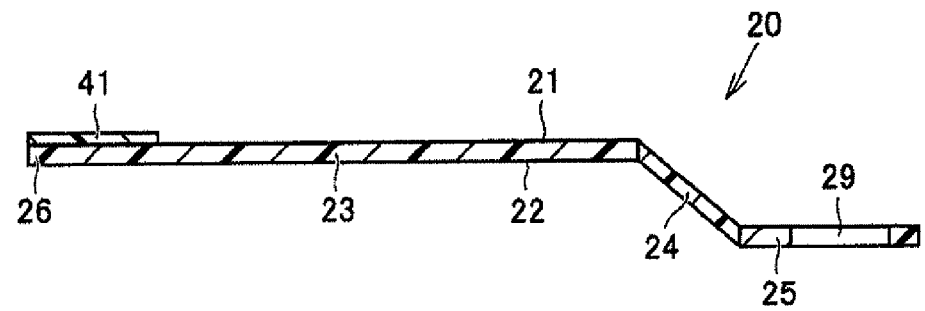
FIG. 10 is a diagram showing a variation of the cross-section of the plate-shaped member shown in FIG. 9.

As shown in FIG. 9, the adhesion portion 41 may be provided so as to cover the top face 21 over the entirety of the lengthwise direction of the extending portion 23. Also, as shown in FIG. 10, the adhesion portion 41 may be provided so as to cover only a portion of the top face 21 in the vicinity of the projecting end 26 of the extending portion 23. Note that FIG. 10 is a diagram showing a variation of the cross-section of the plate-shaped member 20 shown in FIG. 9.

If the adhesion portion 41 is provided on the entirety of the top face 21 of the extending portion 23, the lead 72 can be more reliably fixed to the plate-shaped member 20. On the other hand, in the case of a configuration in which the adhesion portion 41 is provided only in the vicinity of the projecting end 26, the lead 72 can be fixed with the adhesion portion 41 provided on only the minimum necessary portion, thus reducing the required amount of adhesive for forming the adhesion portion 41. Also, since the length of the lead 72 that is fixed to the plate-shaped member 20 is reduced, it is possible to reduce the amount of heat that is directly transmitted from the lead 72 to the plate-shaped member 20 through thermal conduction. In order to further reduce thermal conduction from the lead 72 to the plate-shaped member 20, it is desirable that the adhesive used for the adhesion portion 41 is formed from a material that has low thermal conductivity.

In the case of forming the adhesion portion 41 by printing an adhesive onto the top face 21 of the plate-shaped member 20, the adhesion portion 41 may be provided on the top face 21 in only the range that opposes the lead 72 in the width direction of the extending portion 23 (the widthwise direction of the extending portion 23, which is the vertical direction in FIG. 8). Providing the adhesion portion 41 in only a very narrow range of the top face 21 that corresponds to the region directly below the lead 72 enables forming the adhesion portion 41 with the minimum required amount of adhesive. Also, a configuration in which the adhesive is not provided in the vicinity of the end portions in the width direction of the extending portion 23 is desirable since it is possible to suppress cases in which, when the plate-shaped member 20 is inserted into the probe portion 10b of the main housing 10, the insertion of the plate-shaped member 20 is hindered due to the adhesive coming into contact with an inner wall face of the probe portion 10b.

Since the lead 72 is fixed to the plate-shaped member 20 via the adhesion portion 41 in this way, the thermistor 74 can be positioned during assembly of the electronic thermometer 1, thus preventing bending and directional misalignment of the lead 72 as described above. The assembly 18, the plate-shaped member 20 fixed to the assembly 18, and the thermistor 74 whose lead 72 is affixed to the plate-shaped member 20 can be treated as one integrated structure, and this structure can be easily inserted into the hollow portion 13 inside the main housing 10. This enables automation of the step for inserting the thermistor 74 and the assembly 18 into the main housing 10 during electronic thermometer assembly, and enables the electronic thermometer 1 to be manufactured inexpensively.

Also, due to the thermistor 74 being positioned, the temperature sensing unit 73 and the lead 72 can be precisely arranged at predetermined positions. This enables suppressing a reduction in the measurement precision of the electronic thermometer 1 due to positional misalignment of the temperature sensing unit 73. This also enables suppressing variation in quality between individual electronic thermometers 1.

Additionally, the lead 72 is fixed using the plate-shaped member 20 that is made of resin or hard paper, and there is no need for an increase in the size of or change in the shape of the printed circuit board as in above-described Patent Literature 1, thus making it possible to suppress an increase in the material cost of the electronic thermometer 1. Since the thermistor 74 is a common radial lead thermistor that has the temperature sensing unit 73 and the lead 72, and there is no need for a specially-shaped temperature sensor, the electronic thermometer can be manufactured even more inexpensively.

Second Embodiment

Figure 11:
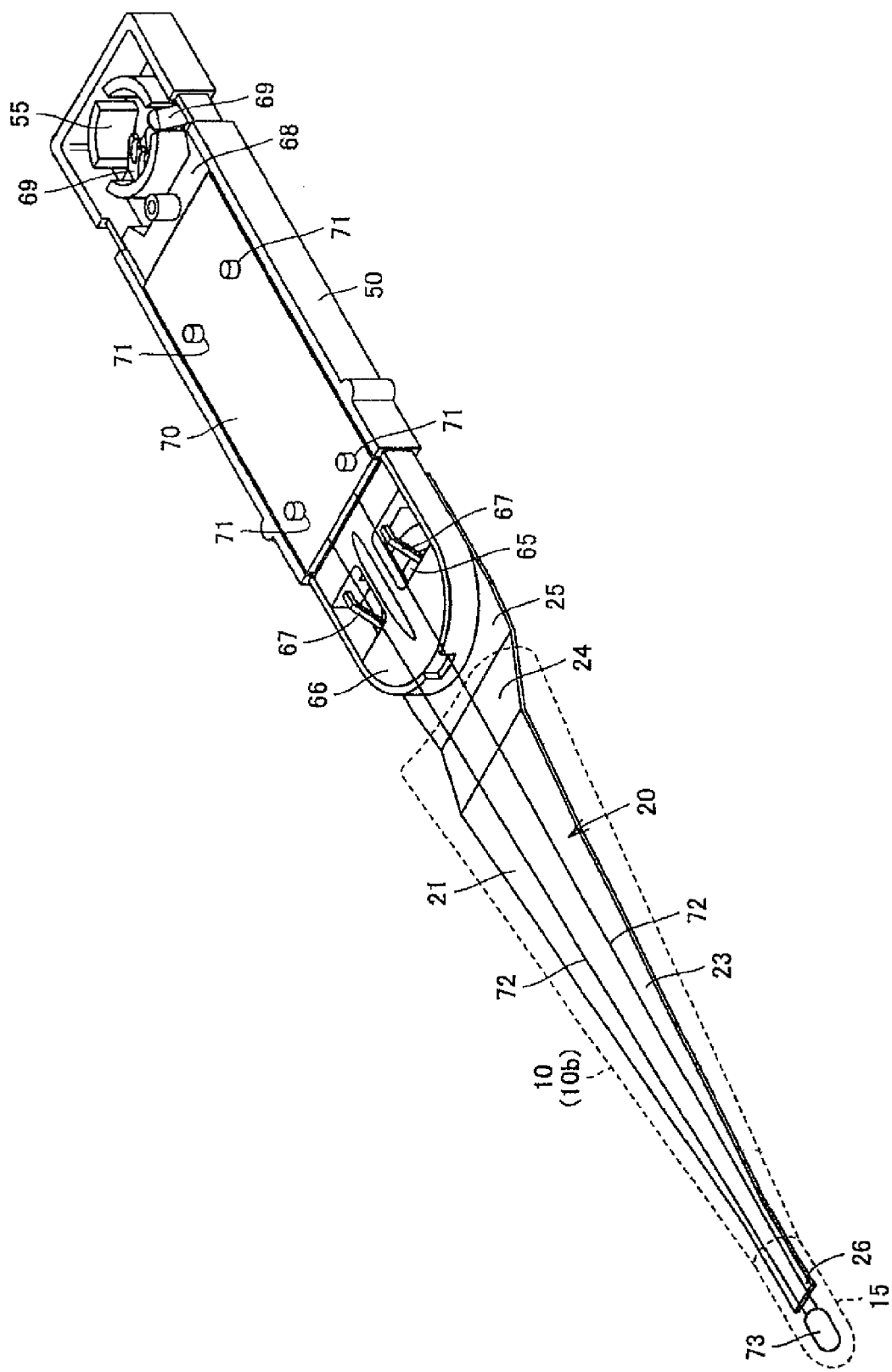
FIG. 11 is a perspective view of an internal structure of an electronic thermometer according to a second embodiment.
Figure 12:
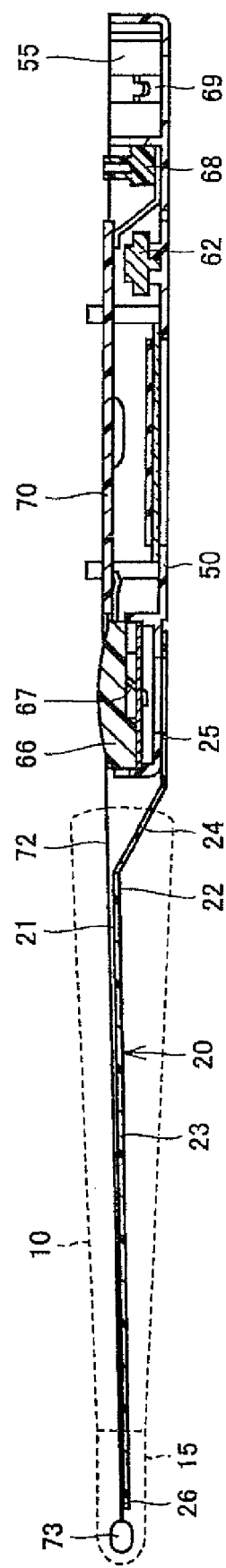
FIG. 12 is a cross-sectional view of the internal structure of the electronic thermometer according to the second embodiment.
Figure 13:
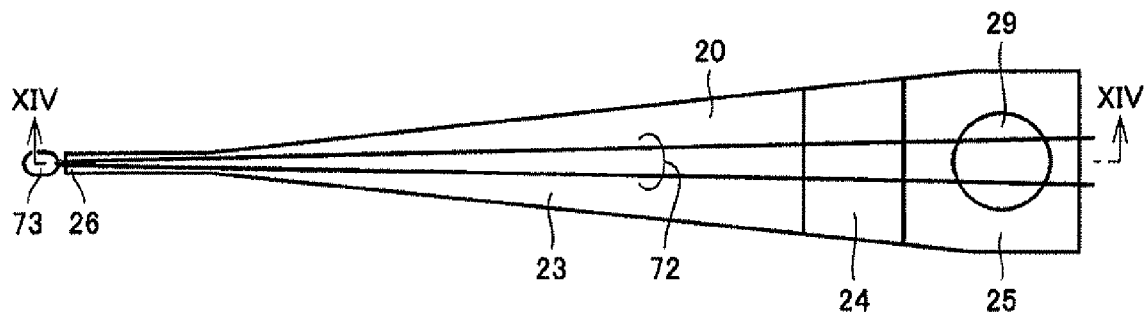
FIG. 13 is a plan view of an arrangement of a plate-shaped member and a lead according to the second embodiment.
Figure 14:
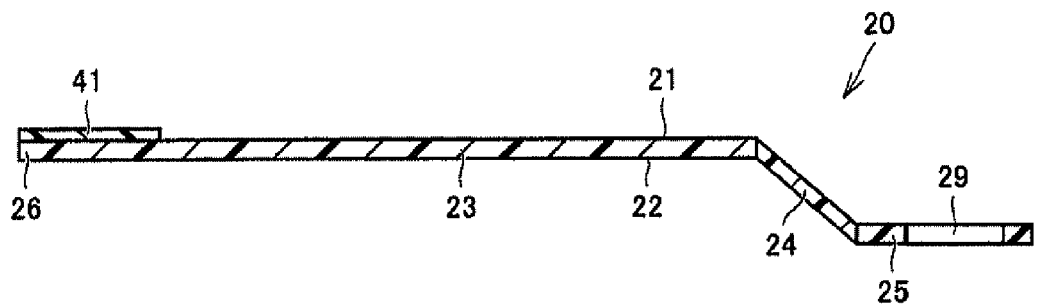
FIG. 14 is a cross-sectional view of the plate-shaped member according to the second embodiment taken along line XIV-XIV shown in FIG. 13.

FIG. 11 is a perspective view of the internal structure of the electronic thermometer 1 according to a second embodiment. FIG. 12 is a cross-sectional view of the internal structure of the electronic thermometer 1 according to the second embodiment. FIG. 13 is a plan view of the arrangement of the plate-shaped member 20 and the lead 72 according to the second embodiment. FIG. 14 is a cross-sectional view of the plate-shaped member 20 according to the second embodiment taken along line XIV-XIV shown in FIG. 13. The electronic thermometer 1 of the second embodiment is different from the above-described first embodiment with respect to the shape of the plate-shaped member 20.

Specifically, the extending portion 23 of the plate-shaped member 20 of the second embodiment extends from the probe portion 10b to the interior of the cap 15, and the projecting end 26 of the plate-shaped member 20 is arranged inside the cap 15. The plate-shaped member 20 extends to a position very close to the temperature sensing unit 73 of the thermistor 74. The adhesion portion 41 is provided so as to cover a portion of the top face 21 of the plate-shaped member 20 in the vicinity of the projecting end 26. Note that similarly to FIG. 9, the adhesion portion 41 may be provided so as to cover the top face 21 over the entirety of the lengthwise direction of the extending portion 23.

Due to increasing the extending length of the plate-shaped member 20 in this way, a longer range of the lead 72 can be positioned with respect to the plate-shaped member 20, compared to the first embodiment. This enables more reliably preventing bending and directional misalignment of the lead 72 during assembly of the electronic thermometer 1.

Third Embodiment

Figure 15:
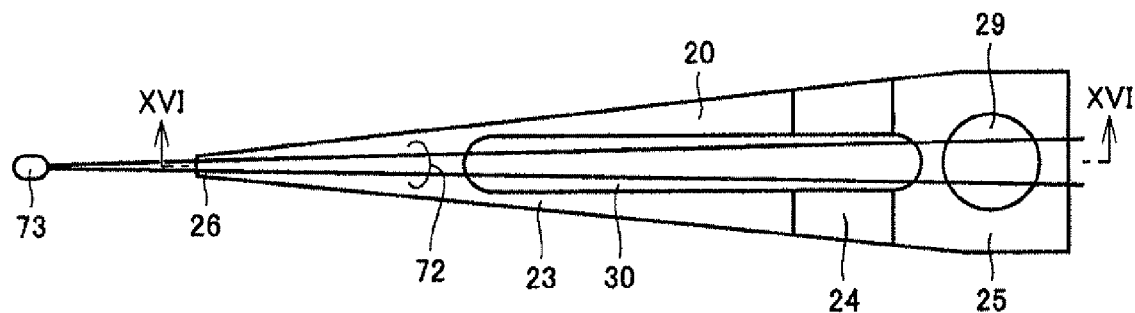
FIG. 15 is a plan view of an arrangement of a plate-shaped member and a lead according to a third embodiment.
Figure 16:
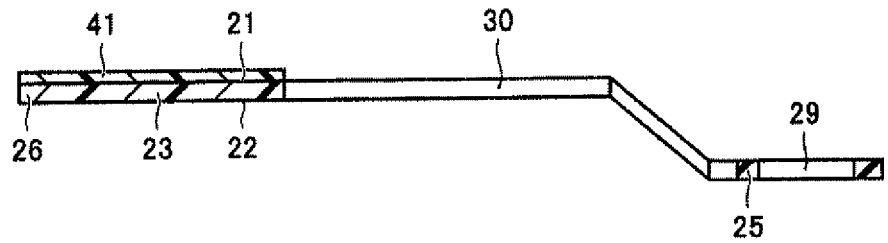
FIG. 16 is a cross-sectional view of the plate-shaped member according to the third embodiment taken along line XVI-XVI shown in FIG. 15.

FIG. 15 is a plan view of the arrangement of the plate-shaped member 20 and the lead 72 according to a third embodiment. FIG. 16 is a cross-sectional view of the plate-shaped member 20 according to the third embodiment taken along line XVI-XVI shown in FIG. 15. As shown in FIGS. 15 and 16, a through-hole 30 that pierces the plate-shaped member 20 in the thickness direction is provided in the plate-shaped member 20 of the third embodiment. The through-hole 30 is formed from the base portion 25 to the extending portion 23, extending along the extending direction of the plate-shaped member 20. The lead 72 is arranged so as to extend beyond the through-hole 30.

Figure 17:
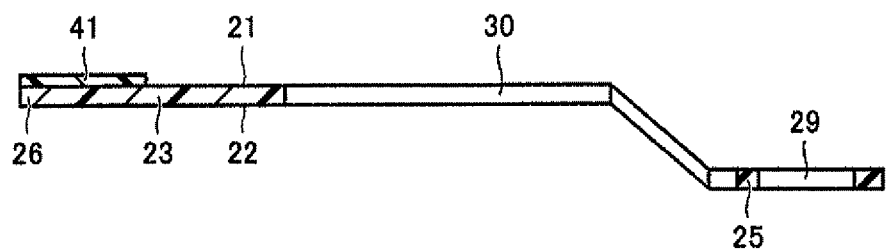
FIG. 17 is a diagram showing a variation of the cross-section of the plate-shaped member shown in FIG. 16.

As shown in FIG. 16, the adhesion portion 41 of the third embodiment is provided on the top face 21 of the plate-shaped member 20 at a position on the projecting end 26 side relative to the through-hole 30. The adhesion portion 41 is arranged at a position that opposes the base portion 25, which is fixed to the assembly 18, with the through-hole 30 interposed therebetween. The adhesion portion 41 is provided so as to cover the top face 21 over the entire portion of the extending portion 23 that is on the projecting end 26 side relative to the through-hole 30. Also, as shown in FIG. 17, the adhesion portion 41 may be provided so as to cover only a portion of the top face 21 that is in the vicinity of the projecting end 26 of the extending portion 23, and is on the side that is away from the base portion 25 fixed to the assembly 18. Note that FIG. 17 is a diagram showing a variation of the cross-section of the plate-shaped member 20 shown in FIG. 16.

The larger the contact portion of the lead 72 that is in contact with the plate-shaped member 20, the more advantageous it is to the positioning of the thermistor 74 during assembly of the electronic thermometer 1. However, as the contact portion increases in size, more of the heat that is applied to the temperature sensing unit 73 due to the transmission of body heat from the measurement site is transmitted from the lead 72 to the plate-shaped member 20, thus resulting in a slower thermal response of the electronic thermometer 1.

In view of this, if the through-hole 30 is formed in a portion of the plate-shaped member 20, and the lead 72 is arranged so as to span across the through-hole 30 as shown in FIG. 15, the contact between the plate-shaped member 20 and the lead 72 is limited to the minimum range required to position the lead 72 on the plate-shaped member 20 in the vicinity of the projecting end 26 of the plate-shaped member 20. As a result, the area of contact between the lead 72 and the top face 21 of the plate-shaped member 20 can be reduced. The through-hole 30 formed in the plate-shaped member 20 functions as a contact reduction portion for reducing contact between the lead 72 and the top face 21 of the plate-shaped member 20.

This configuration enables reducing the amount of heat that escapes through the plate-shaped member 20 when heat is applied to the thermistor 74 during body temperature measurement, thus making it possible to improve the thermal response of the electronic thermometer 1. This enables providing an electronic thermometer that can precisely measure the body temperature at a measurement site in a short time, and thus is advantageous to fast measurement.

Fourth Embodiment

Figure 18:
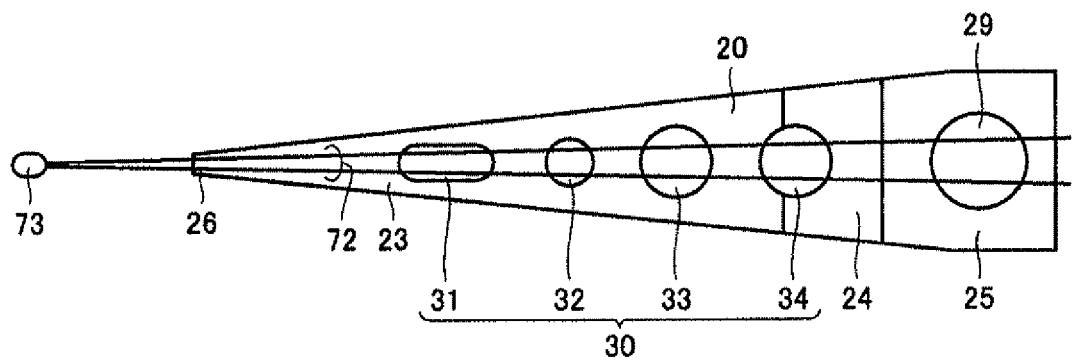
FIG. 18 is a plan view of an arrangement of a plate-shaped member and a lead according to a fourth embodiment.

FIG. 18 is a plan view of the arrangement of the plate-shaped member 20 and the lead 72 according to a fourth embodiment. A large elongated hole-shaped through-hole 30 that extends in the lengthwise direction of the plate-shaped member 20 is formed in the plate-shaped member 20 of the third embodiment shown in FIG. 17. In contrast, multiple small holes 31 to 34 are formed in the plate-shaped member 20 of the fourth embodiment shown in FIG. 18, and these small holes 31 to 34 form the through-hole 30.

In the case of reducing the thickness of the plate-shaped member 20 for a reason such as reducing the cost of the plate-shaped member 20, the strength of the plate-shaped member 20 decreases as the thickness decreases. If the through-hole 30 is formed so as to be divided into the small holes 31 to 34, the strength of the plate-shaped member 20 can be increased compared the case of forming the one elongated hole shown in FIG. 15. Also, the path for heat transmitted by the plate-shaped member 20 becomes complicated due to forming the small holes 31 to 34, thus enabling obtaining an effect of making it more difficult for heat to escape via the plate-shaped member 20.

Fifth Embodiment

Figure 19:
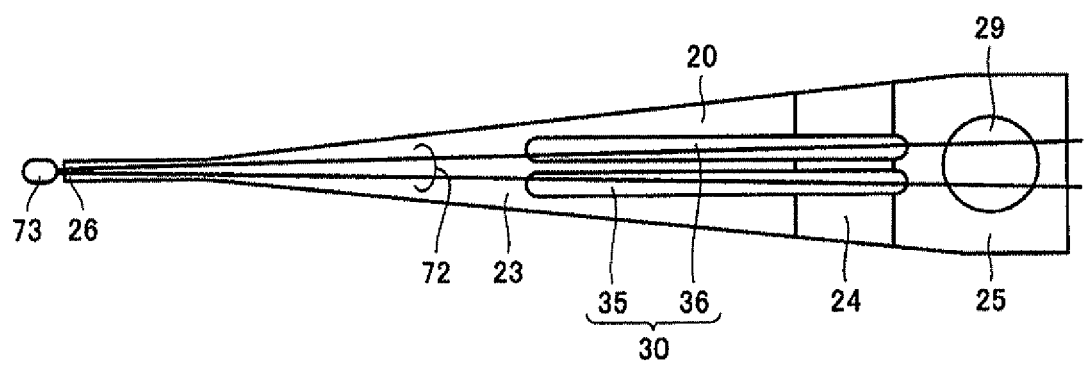
FIG. 19 is a plan view of an arrangement of a plate-shaped member and a lead according to a fifth embodiment.

FIG. 19 is a plan view of the arrangement of the plate-shaped member 20 and the lead 72 according to a fifth embodiment. The plate-shaped member of the fifth embodiment is different from the embodiments shown in FIGS. 15 and 18 in that two narrow elongated holes 35 and 36 are formed, and these narrow elongated holes 35 and 36 form the through-hole 30.

Forming the narrow elongated holes 35 and 36 enables improving the strength of the plate-shaped member 20 in the lengthwise direction compared to the case of forming the one elongated hole shown in FIG. 15. In the case of forming the small holes 31 to 34 shown in FIG. 18, the strength of the plate-shaped member 20 with respect to folding and bending decreases in the portions where the small holes 31 to 34 are formed, but forming the narrow elongated holes 35 and 36 that have a constant width enables avoiding a reduction in this strength with respect to folding and bending, thus making it possible to provide an even stronger plate-shaped member 20.

Note that the third to fifth embodiments describe examples in which the through-hole 30 is formed in the plate-shaped member 20 as a contact reduction portion for reducing contact between the lead 72 and the top face 21 of the plate-shaped member 20, and thus a portion is cut out of the plate-shaped member 20 on which the lead 72 is placed. The plate-shaped member 20 of the present invention is not limited to such a configuration. For example, a projection portion in which a portion of the top face 21 projects outward due to press processing or the like, a recessed portion in which a portion of the top face 21 is recessed, or the like may be formed in the plate-shaped member 20. Forming the projection portion or the recessed portion in the top face 21 that opposes the lead 72 enables similarly obtaining an effect of reducing contact between the lead 72 and the plate-shaped member 20.

Sixth Embodiment

Figure 20:
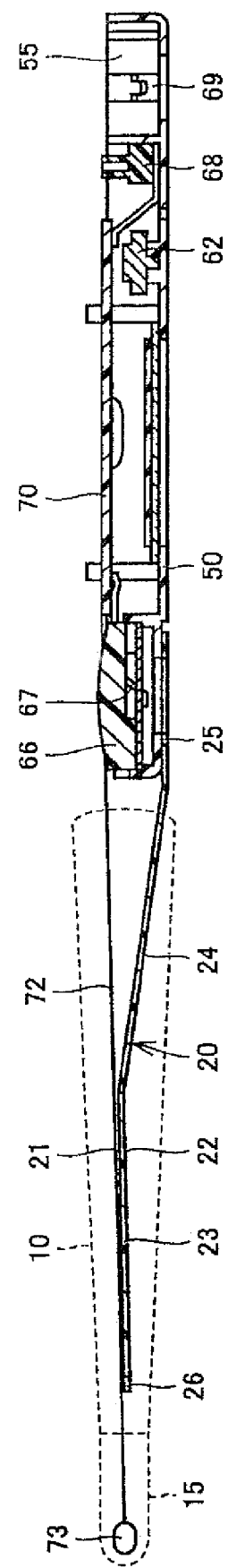
FIG. 20 is a cross-sectional view of an internal structure of an electronic thermometer according to a sixth embodiment.

FIG. 20 is a cross-sectional view of the internal structure of the electronic thermometer 1 according to a sixth embodiment. The first embodiment described with reference to FIG. 7 describes an example of providing a plate-shaped member that has been subjected to bending processing in advance. In contrast, the plate-shaped member 20 of the sixth embodiment has a flat plate shape. With the electronic thermometer 1 of the sixth embodiment, which includes the flat plate-shaped member 20, it is possible to reduce the cost of the electronic thermometer 1 since there is no need to subject the plate-shaped member 20 to bending processing.

The end portion on the opposite side of the projecting end 26 that forms one end of the plate-shaped member 20 is attached to the sub-case 50 of the assembly 18, thus forming the base portion 25. The adhesion portion 41 (not shown in FIG. 20) is provided on the top face 21 in the vicinity of the projecting end 26. Due to the lead 72 being affixed to the adhesion portion 41, the extending portion 23 is formed along the extending direction of the lead 72 in the vicinity of the projecting end 26 of the plate-shaped member 20.

Since the flat plate-shaped member 20 that has no folds or bends is attached to the assembly 18, and then the lead 72 is affixed to the adhesion portion 41 provided on the top face 21 of the plate-shaped member 20, the plate-shaped member 20 shown in FIG. 20 ends up being in the bent state. FIG. 20 shows the state in which the lead 72 was attached to the top face 21 of the plate-shaped member 20, and was then inserted into the main housing 10. In other words, it should be noted that FIG. 20 does not show the state immediately after the plate-shaped member 20 was attached to the assembly 18.

Since the lead 72 is fixed to the plate-shaped member 20 in only the minimum required portion in the vicinity of the projecting end 26, and there is an increase in the size of the portion of the plate-shaped member 20 that does not come into contact with the lead 72, it is possible to reduce contact between the lead 72 and the top face 21 of the plate-shaped member 20. This enables reducing the amount of heat that escapes through the plate-shaped member 20 when heat is applied to the thermistor 74 during body temperature measurement, thus making it possible to improve the thermal response of the electronic thermometer 1.

Seventh Embodiment

Figure 21:
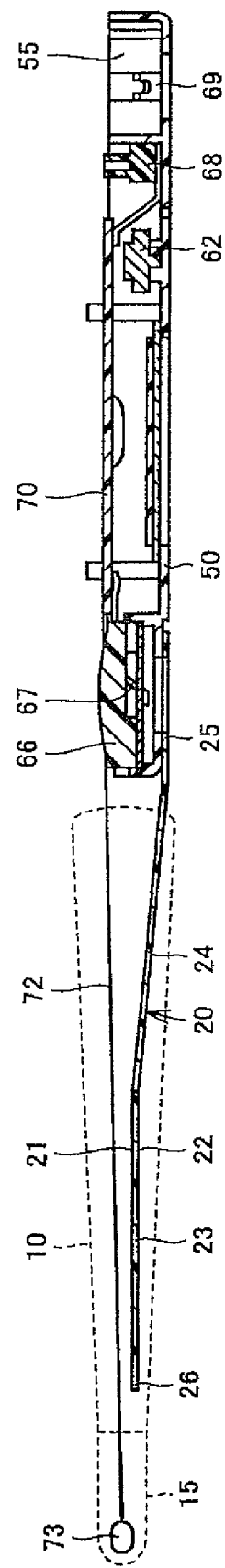
FIG. 21 is a cross-sectional view of an internal structure of an electronic thermometer according to a seventh embodiment.

FIG. 21 is a cross-sectional view of the internal structure of the electronic thermometer 1 according to a seventh embodiment. Unlike the previous embodiments, with the electronic thermometer 1 of the seventh embodiment, the lead 72 is arranged in a contactless state with respect to the plate-shaped member 20 when the assembly of the electronic thermometer 1 is entirely complete.

For example, the adhesive of the adhesion portion 41 is formed from a material that has the property that its adhesive characteristics decrease when heat is applied, and the lead 72 can be detached from the plate-shaped member 20 by applying heat to the adhesion portion 41 so as to reduce its adhesive characteristics after completion of the assembly of the electronic thermometer 1. For example, an acrylic ultraviolet curable adhesive that detaches when heated to 90 to 100° C. may be used as the adhesive.

Additionally, the plate-shaped member 20 itself undergoes deformation when the adhesive characteristics of the adhesion portion 41 decrease, thus enabling more reliably arranging the lead 72 so as to not be in contact with the plate-shaped member 20. For example, the plate-shaped member 20 may be thermally deformed by applying heat. As another example, a configuration is possible in which the lead 72 is affixed to the adhesion portion 41 while the plate-shaped member 20 is elastically deformed, and then the plate-shaped member 20 undergoes deformation so as to return to its original shape due to the release of the elastic force when the adhesive characteristics of the adhesion portion 41 decrease. As yet another example, another member such as a flat spring may be provided in order to exert elastic force on the plate-shaped member 20 so as to elastically deform the plate-shaped member 20 when the adhesive characteristics of the adhesion portion 41 decrease.

If the lead 72 and the plate-shaped member 20 are in a contactless state, it is possible to prevent heat applied to the thermistor 74 during body temperature measurement from escaping via the plate-shaped member 20. This enables further improving the thermal response of the electronic thermometer 1. Also, variation will occur between the electronic thermometer 1 products if there are both products in which the lead 72 and the plate-shaped member 20 are in contact and products in which they are not in contact, and therefore in order to minimize error between individual electronic thermometers 1, it is desirable that quality management is performed such that the lead 72 and the plate-shaped member 20 are in a contactless state after completion of the assembly of the electronic thermometer 1.

Figure 22:
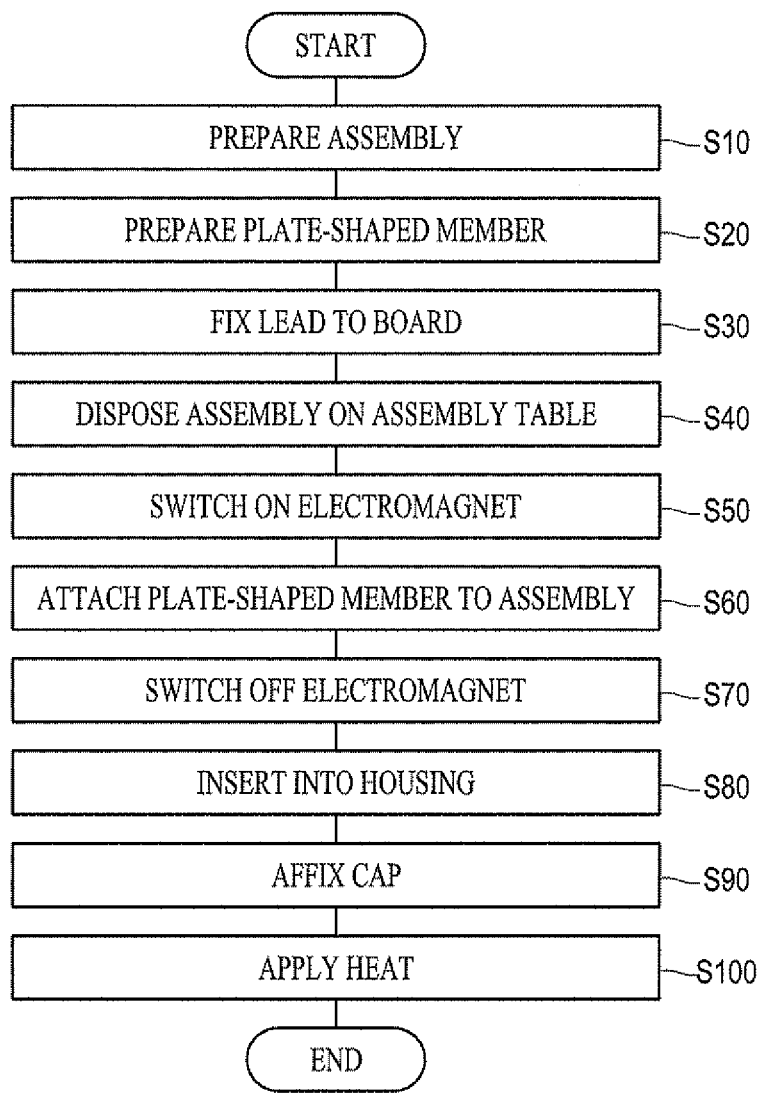
FIG. 22 is a flowchart showing an example of an electronic thermometer manufacturing method.
Figure 23:
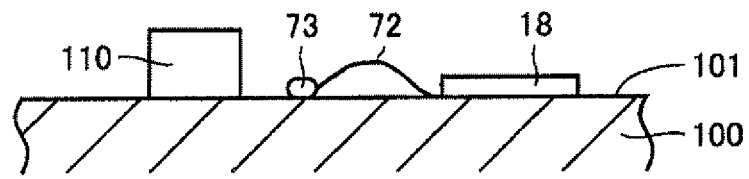
FIG. 23 is a schematic diagram showing step S40 of the manufacturing method shown in FIG. 22.
Figure 24:
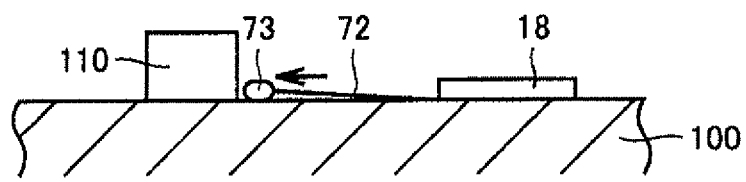
FIG. 24 is a schematic diagram showing step S50 of the manufacturing method shown in FIG. 22.
Figure 25:
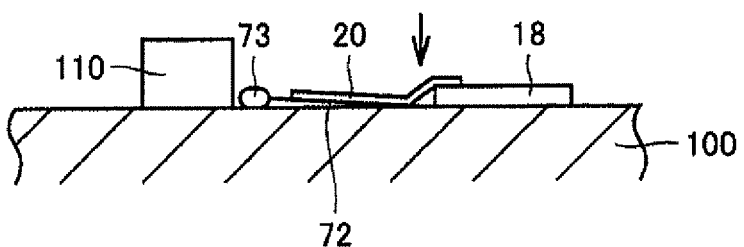
FIG. 25 is a schematic diagram showing step S60 of the manufacturing method shown in FIG. 22.

The following describes a method for manufacturing the electronic thermometer 1 having the above-described configuration. FIG. 22 is a flowchart showing an example of a method for manufacturing the electronic thermometer 1. FIG. 23 is a schematic diagram showing step S40 of the manufacturing method shown in FIG. 22. FIG. 24 is a schematic diagram showing step S50 of the manufacturing method shown in FIG. 22. FIG. 25 is a schematic diagram showing step S60 of the manufacturing method shown in FIG. 22. The following describes an example of a method for manufacturing the electronic thermometer 1 with reference to FIGS. 22 to 25.

First, in step S10, the assembly 18 is prepared in the state in which all of the constituent elements have been assembled, including the display unit assembly 61, the operation unit assembly 62, the button cell housed in the cell housing portion 55, and the printed circuit board 70. Next, in step S20, the plate-shaped member 20 is prepared. The plate-shaped member 20 has the adhesion portion 41 that has adhesive characteristics on the top face 21. Next, in step S30, the thermistor 74 serving as the temperature sensor is prepared, including the temperature sensing unit 73 that measures the body temperature of a measurement subject and the lead 72 whose one end 75 is fixed to the temperature sensing unit 73, and then the other end 76 of the lead 72 is fixed to the printed circuit board 70.

Next, in step S40, the assembly 18 is disposed on a top face 101 of an assembly table 100. Before disposing the assembly 18, out from which the thermistor 74 is projecting, junk metal is brushed off the top face 101 of the assembly table 100. Although the assembly 18 is fixed to the top face 101 of the assembly table 100 in the state shown in FIG. 23, the temperature sensing unit 73 and the lead 72 that configure the thermistor 74 are not fixed to the assembly table 100. Also, an electromagnet 110 is provided on the top face 101 of the assembly table 100. When the assembly 18 is fixed to the top face 101 of the assembly table 100, the position at which and direction in which the assembly 18 is disposed is adjusted such that the lead 72 that projects out from the tip of the assembly 18 faces the electromagnet 110 side.

Next, in step S50, the curvature of the lead 72 is reduced by orienting the lead 72 in the appropriate direction, and the shape of the lead 72 is corrected so as to be closer to a straight shape. The temperature sensing unit 73 and the lead 72 that are included in the thermistor 74 are both formed from a ferromagnetic material and can be magnetized by a magnet. In view of this, when the assembly 18 is disposed on the top face 101 of the assembly table 100 as shown in FIG. 23, and the electromagnet 110 is switched on so as to generate magnetic force, the temperature sensing unit 73 is pulled toward the electromagnet 110 as shown in FIG. 24. As a result, the lead 72 that had a curved portion in FIG. 23 moves toward the electromagnet 110 along with the temperature sensing unit 73, and thus is extended due to tensile force. Accordingly, the curvature of the lead 72 is reduced, and the lead 72 is deformed into a shape closer to a straight shape.

Here, another electromagnet different from the electromagnet 110 may be embedded inside the assembly table 100. This other electromagnet may be arranged at a position inside the assembly table 100 that corresponds to a position below the lead 72 in a range longer than the entire length of the lead 72 when the lead 72 is fully extended as shown in FIG. 24. Then, when the lead 72 is pulled straight as shown in FIG. 24, the other electromagnet is switched on so as to generate magnetic force, and thus the lead 72 can be reliably held in the state of being extended in a straight manner.

Next, in step S60, the plate-shaped member 20 is attached to an end portion of the assembly 18. With the lead 72 straight as shown in FIG. 24, the plate-shaped member 20 is arranged such that its top face 21 faces the lead 72. At this time, the adhesion portion 41 disposed on the top face 21 is also arranged so as to oppose the lead 72. The plate-shaped member 20 arranged in this way is attached to the end portion of the assembly 18 on the side on which the lead 72 projects out as shown in FIG. 25. Accordingly, the lead 72 is adhered to the adhesion portion 41, and the lead 72 is fixed onto the top face 21 of the plate-shaped member 20.

Next, in step S70, the electromagnet 110 is switched off. Even when the electromagnet 110 is switched off, the lead 72 extending in a straight manner is kept positioned with respect to the plate-shaped member 20 since the lead 72 was affixed to the adhesion portion 41 in the previous step. Next, in step S80, the hollow main housing 10 is prepared, and with the lead 72 adhered to the adhesion portion 41, the assembly 18 is inserted into the main housing 10, the end portion side to which the plate-shaped member 20 is attached being inserted first. Since the lead 72 is affixed to the adhesion portion 41 on the top face 21 of the plate-shaped member 20, there is no bending or directional misalignment of the lead 72, and the assembly 18, one end portion from which the thermistor 74 projects out for a long distance, can be easily moved into the main housing 10.

Next, in step S90, the cap 15 is adhered to the tip portion 11 of the main housing 10. Accordingly, the temperature sensing unit 73 of the thermistor 74 is fixed inside the cap 15 on the tip portion 11 side, and the lead 72 is housed inside the probe portion 10b inside the main housing 10.

Next, in step S100, the tip portion 11 side of the main housing 10 is heated for a predetermined time. This heating causes curing of an adhesive that was supplied between the cap 15 and the tip portion 11 of the main housing 10 in the previous step, and thus the cap 15 is reliably adhered to the main housing 10.

Also, if the adhesion portion 41 is formed using an adhesive that has the property that its adhesive characteristics decrease when heat is applied, the adhesion characteristics of the adhesive decrease due to the above-described heating, and thus the lead 72 detaches from the adhesion portion 41 and separates from the plate-shaped member 20. At this time, the plate-shaped member 20 itself may be deformed by the effect of the heating, elastic force, or the like, and in this case, it is possible to reliably obtain a contactless state in which the lead 72 is not in contact with the plate-shaped member 20. This configuration is desirable since heat is not directly conducted from the lead 72 to the plate-shaped member 20, thus improving the thermal response of the electronic thermometer 1 and making fast measurement possible, as well as enabling a reduction in measurement precision error between individual electronic thermometers 1.

By performing the above-described steps shown in FIG. 22, it is possible to easily manufacture the electronic thermometer 1 in which the adhesion portion 41 that has adhesive characteristics is provided on the top face 21 of the plate-shaped member 20 that opposes the lead 72. Bending and directional misalignment of the lead 72 of the thermistor 74 can be prevented when the thermistor 74 and the assembly 18 are inserted into the main housing 10, thus making it possible to inexpensively manufacture the electronic thermometer 1, suppress a reduction in the measurement precision of the electronic thermometer 1, and suppress variation in quality between individual electronic thermometers 1. Note that the adhesion portion 41 (and the plate-shaped member 20) may be heated by supplying hot air through the tip portion 11 of the main housing 10 before the cap 15 is adhered to the main housing 10.

Figure 26:
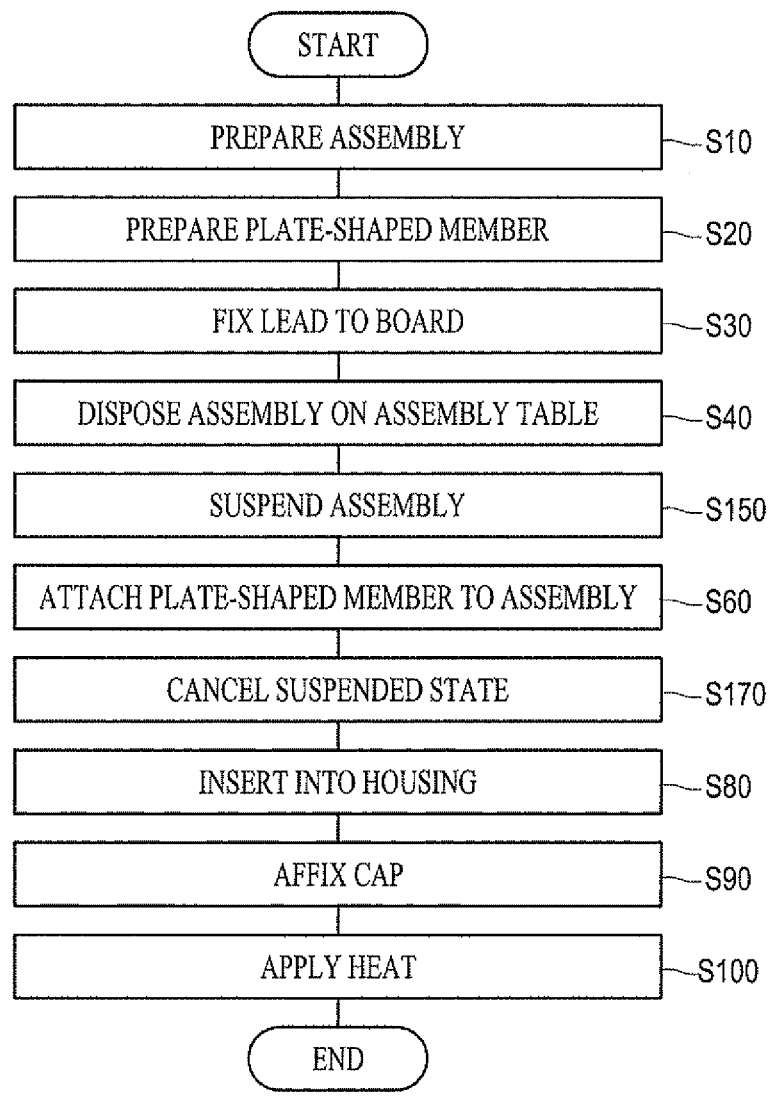
FIG. 26 is a flowchart showing another example of an electronic thermometer manufacturing method.
Figure 27:
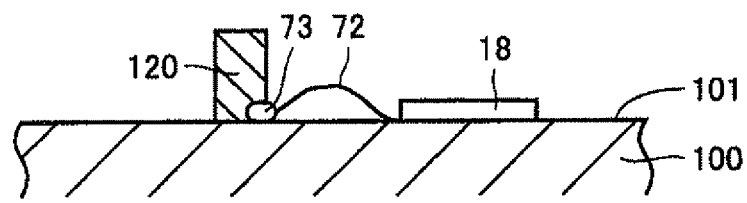
FIG. 27 is a schematic diagram showing step S40 of the manufacturing method shown in FIG. 26.
Figure 28:
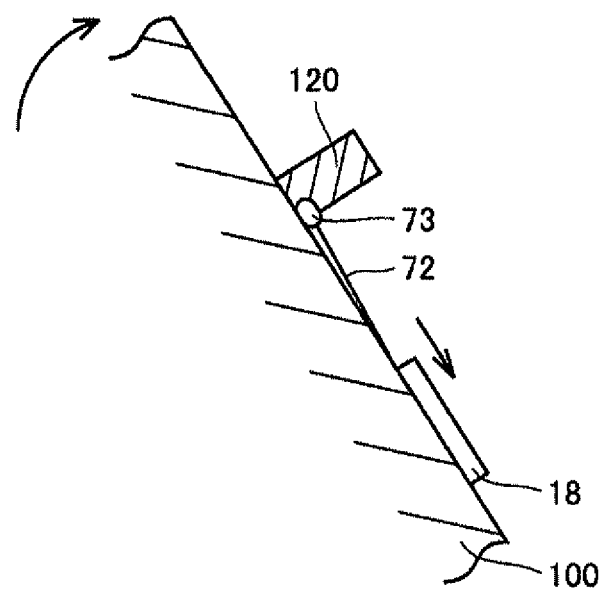
FIG. 28 is a schematic diagram showing step S150 of the manufacturing method shown in FIG. 26.
Figure 29:
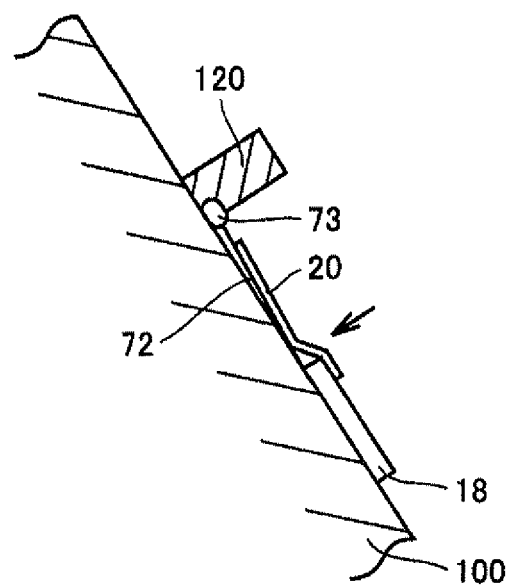
FIG. 29 is a schematic diagram showing step S60 of the manufacturing method shown in FIG. 26.

FIG. 26 is a flowchart showing another example of a method for manufacturing the electronic thermometer 1. FIG. 27 is a schematic diagram showing step S40 of the manufacturing method shown in FIG. 26. FIG. 28 is a schematic diagram showing step S150 of the manufacturing method shown in FIG. 26. FIG. 29 is a schematic diagram showing step S60 of the manufacturing method shown in FIG. 26. The following describes another example of a method for manufacturing the electronic thermometer 1 with reference to FIGS. 26 to 29.

Steps S10 to S30 shown in FIG. 26 will not be described since they are the same as steps S10 to S30 shown in FIG. 22. Next, in step S40, the assembly 18 is disposed on the top face 101 of the assembly table 100. In the state shown in FIG. 27, the temperature sensing unit 73 of the thermistor 74 that is attached to the end portion of the assembly 18 is fixed to a holding portion 120 provided on the top face 101 of the assembly table 100. On the other hand, the lead 72 and the assembly 18 are not fixed to the assembly table 100.

Next, in step S150, the curvature of the lead 72 is reduced by orienting the lead 72 in the appropriate direction, and the shape of the lead 72 is corrected so as to be closer to a straight shape. With the temperature sensing unit 73 fixed to the holding portion 120, the assembly table 100 is tilted as shown in FIG. 28, and thus the assembly 18 is suspended from the assembly table 100, and the assembly 18 moves downward in the vertical direction due to the effect of gravity. The assembly table 100 is tilted such that the lead 72 and the assembly 18 are arranged farther downward than the holding portion 120 that holds the temperature sensing unit 73. As a result, the lead 72 that had a curved portion in FIG. 27 is extended due to tensile force as the assembly 18 moves downward. Accordingly, the curvature of the lead 72 is reduced, and the lead 72 is deformed into a shape closer to a straight shape.

At this time, the assembly table 100 may be tilted at any angle. The assembly 18 may be positioned below the temperature sensing unit 73 by moving the assembly table 100 until the top face 101 of the assembly table 100 reaches the vertical orientation. Note that if the assembly 18 is relatively large and heavy, the load applied to the temperature sensing unit 73 and the lead 72 increases, and therefore it is desirable that the assembly table 100 is tilted to an appropriate angle in order to reliably avoid damage to the thermistor 74.

Next, in step S60, the plate-shaped member 20 is attached to an end portion of the assembly 18 similarly to the description made with reference to FIG. 25. Accordingly, the lead 72 is adhered to the adhesion portion 41, and the lead 72 is fixed onto the top face 21 of the plate-shaped member 20.

Next, in step S170, the suspended state of the assembly 18 is canceled. Specifically, the assembly table 100 is moved to its original position such that the top face 101 is substantially horizontal. Even when the suspended state of the assembly 18 is canceled, the lead 72 extending in a straight manner is kept positioned with respect to the plate-shaped member 20 since the lead 72 was affixed to the adhesion portion 41 in the previous step. The subsequent steps S80 to S100 will not be described since they are the same as steps S80 to S100 shown in FIG. 22.

In the case of performing the above-described steps shown in FIG. 26 as well, it is possible to easily manufacture the electronic thermometer 1 in which the adhesion portion 41 that has adhesive characteristics is provided on the top face 21 of the plate-shaped member 20 that opposes the lead 72. Bending and directional misalignment of the lead 72 of the thermistor 74 can be prevented when the thermistor 74 and the assembly 18 are inserted into the main housing 10, thus making it possible to inexpensively manufacture the electronic thermometer 1, suppress a reduction in the measurement precision of the electronic thermometer 1, and suppress variation in quality between individual electronic thermometers 1.

Although embodiments of the present invention have been described above, the configurations of the embodiments may be combined in an appropriate manner. Also, the embodiments disclosed above are to be understood as being in all ways exemplary and in no way limiting. The scope of the present invention is defined not by the aforementioned descriptions but by the scope of the appended claims, and all changes that fall within the scope of the claims and the same essential spirit as the scope of the claims are intended to be included therein as well.

REFERENCE SIGNS LIST 1 electronic thermometer
10 main housing
10a main portion
10b probe portion
11 tip portion
12 rear end portion
13 hollow portion
15 cap
16 obstructing member
18 assembly
20 plate-shaped member
21 top face
22 bottom face
23 extending portion
24 connecting portion
25 base portion
26 projecting end
30 through-hole
31 to 34 small hole
35, 36 narrow elongated hole
41 adhesion portion
50 sub-case
70 printed circuit board
72 lead
73 temperature sensing unit
74 thermistor
75 one end
76 other end
100 assembly table
101 top face
110 electromagnet
120 holding portion

The invention claimed is:

1. An electronic thermometer comprising:
a temperature sensor that includes a temperature sensing unit that measures the body temperature of a measurement subject and a lead having one end that is fixed to the temperature sensing unit;
a hollow housing that houses the lead and in which the temperature sensing unit is arranged on a tip side;
a board to which another end of the lead is fixed;
an assembly that includes the board and is housed in the housing; and
a plate-shaped member that is attached to the assembly and is arranged on the tip side of the housing relative to the assembly,
wherein the plate-shaped member has an adhesion portion that has adhesive characteristics on a top face that opposes the lead.

2. The electronic thermometer according to claim 1, wherein a contact reduction portion that reduces contact between the lead and the top face is formed in the plate-shaped member.

3. The electronic thermometer according to claim 1, wherein the adhesion portion positions the lead relative to the plate-shaped member when the lead is affixed to the adhesion portion.

4. The electronic thermometer according to claim 1, wherein the adhesion portion has a property that the adhesive characteristics decrease when heat is applied.

5. The electronic thermometer according to claim 1, wherein the lead is arranged in a contactless state with respect to the plate-shaped member.

6. A method for manufacturing an electronic thermometer that comprises:
- a temperature sensor that includes a temperature sensing unit that measures the body temperature of a measurement subject and a lead having one end that is fixed to the temperature sensing unit; and
- a hollow housing that houses the lead, and in which the temperature sensing unit is arranged on a tip side, the manufacturing method comprising:
- a step of preparing an assembly that includes a board;
- a step of preparing a plate-shaped member that has an adhesion portion with adhesive characteristics on a top face;
- a step of fixing another end of the lead to the board;
- a step of reducing curvature of the lead;
- a step of, in a state in which curvature of the lead is reduced, attaching the plate-shaped member to an end portion of the assembly such that the adhesion portion opposes the lead, and adhering the lead to the adhesion portion; and
- a step of, in a state in which the lead is adhered to the adhesion portion, inserting the assembly into the housing, the end portion side to which the plate-shaped member is attached being inserted first.

* * * * *